Aug. 3, 1937.  W. A. ANTILOTTI  2,088,988
VEHICLE WHEEL RIM
Filed Sept. 13, 1934  3 Sheets-Sheet 1
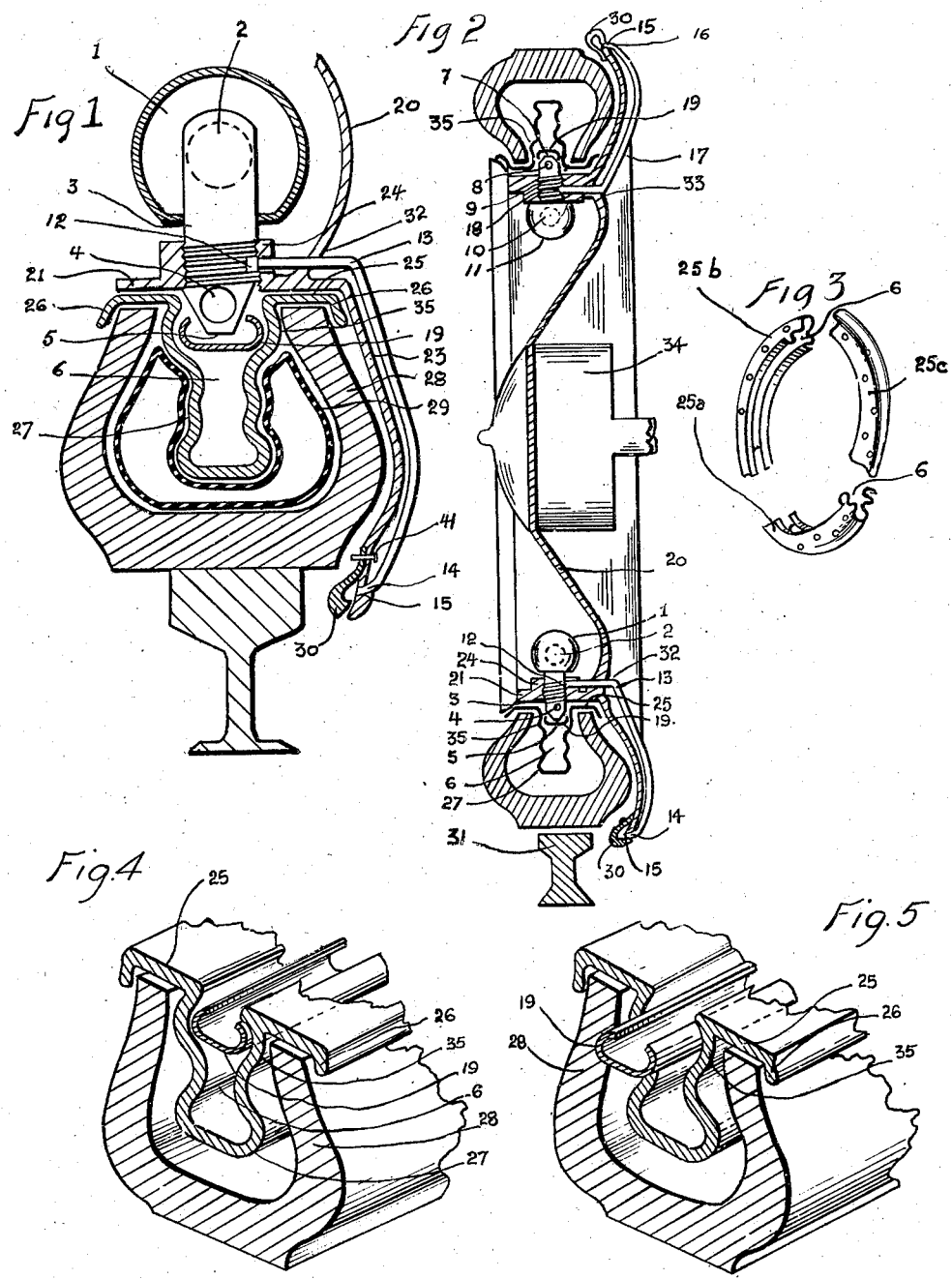
BY *(signature)*
INVENTOR

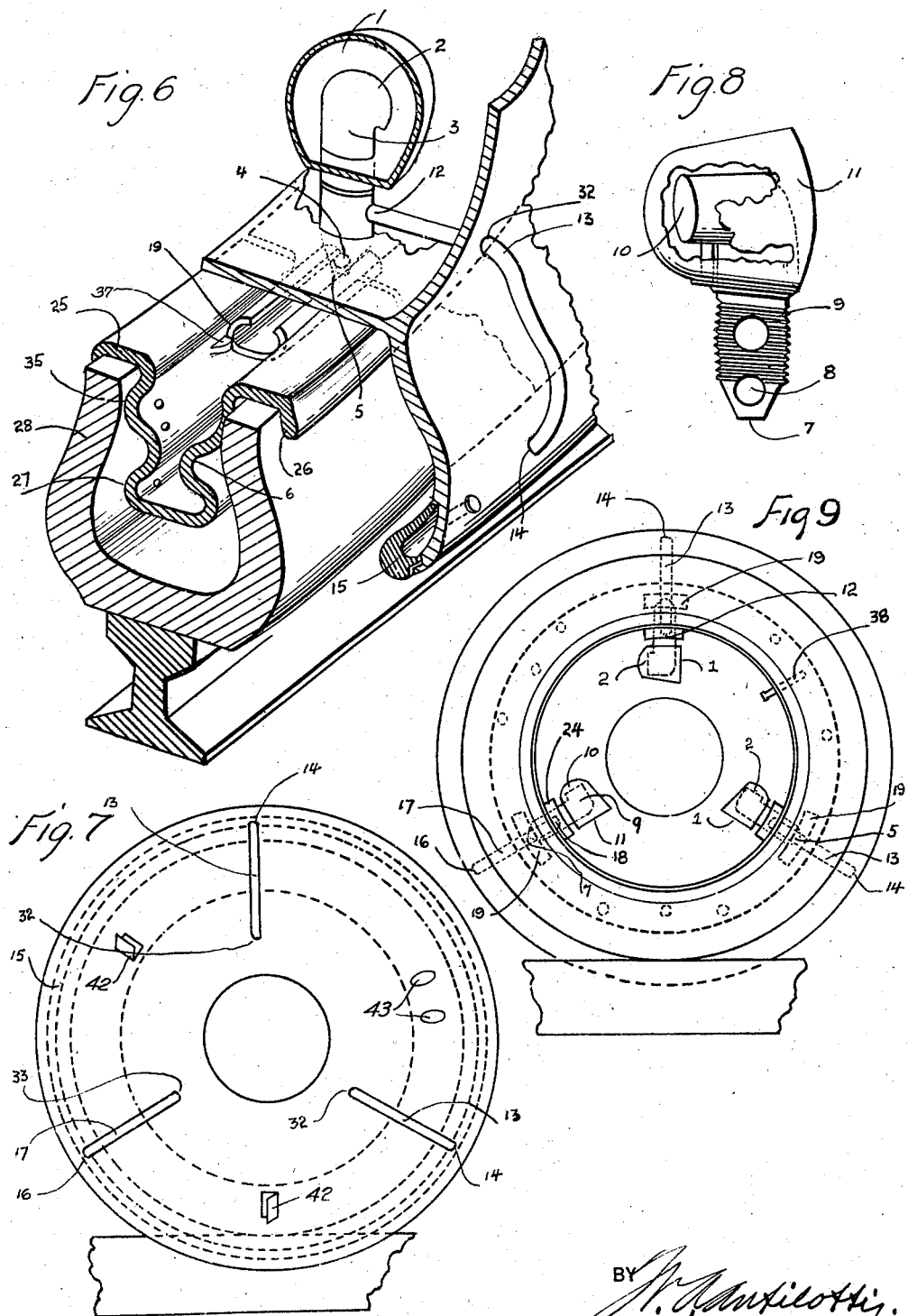

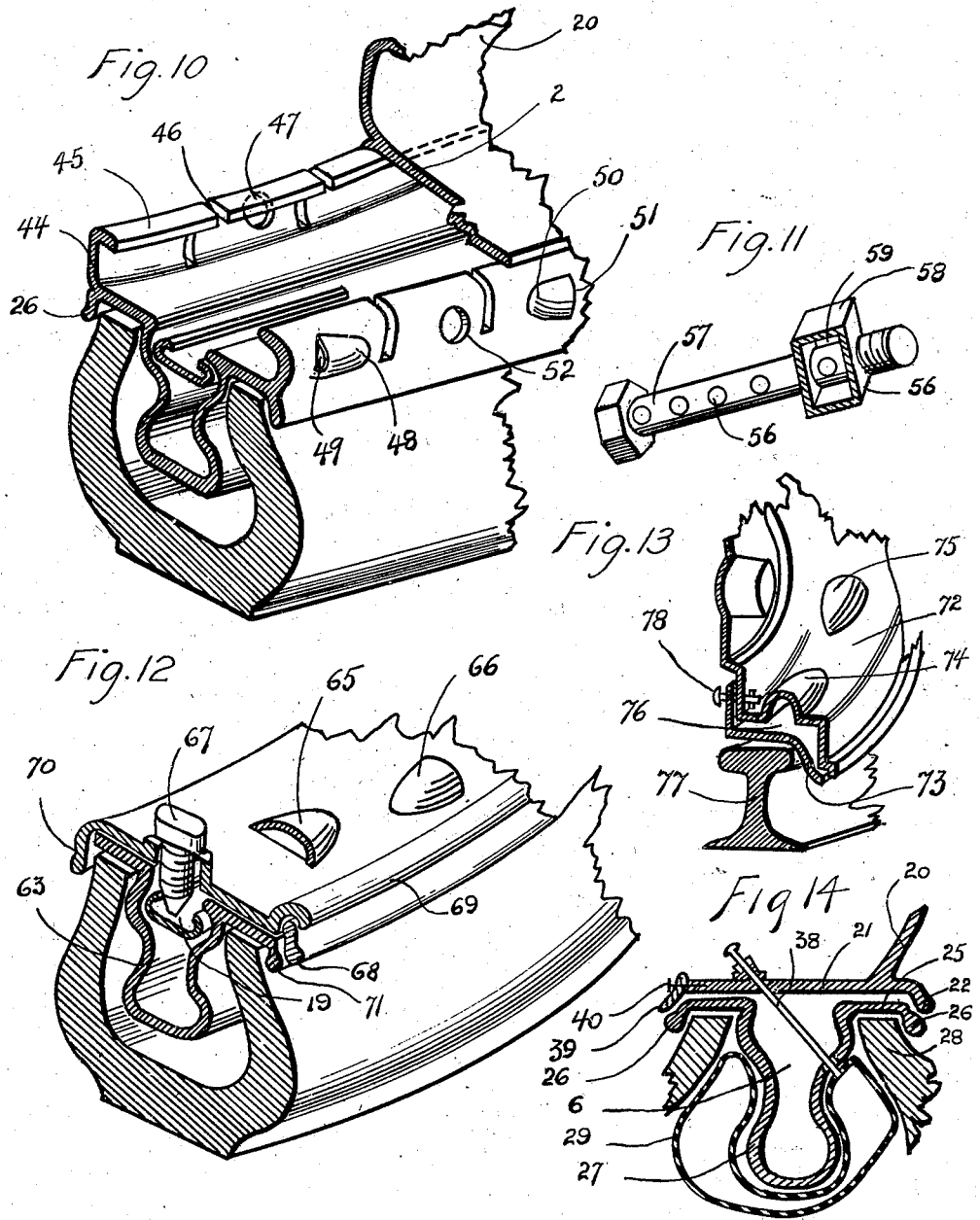

Patented Aug. 3, 1937

2,088,988

UNITED STATES PATENT OFFICE 2,088,988

VEHICLE WHEEL RIM

William A. Antilotti, Atlanta, Ga.

Application September 13, 1934, Serial No. 743,822

17 Claims. (Cl. 295—12)

Objects of invention

As heat is a vitally harmful element in the operation of pneumatic tires this invention relates to a demountable rim and has for one of its objects to provide a device which lowers the temperature of the internal incipient heat generated within a pneumatic tire, prevents the accumulation and congestion of said heat and expels same direct to the atmosphere, the rim especially when mounted on a rotating wheel functioning as an important coacting medium of the device, the cooling draught circulating through coacting elements mounted on the felly of the wheel and thence through a channel in the rim and thence through outlet means mounted on the felly, to the atmosphere.

Another object of this invention is to provide a rim which will, especially when mounted on a rotating wheel function as a device which will solely as of itself reduce vibration also lower the temperature of the internal incipient heat generated within a pneumatic tire, prevents the accumulation and congestion of said heat and expels same direct to the atmosphere.

Another object of my invention is to utilize the energy provided by the rotation of the wheel of a traveling vehicle in the provision of an air circulating device which forces air into the inlet element of said device and creates a vacuum which augments the escape of the air through the outlet element of the device.

A still further object of this invention is to provide a sectional rim the segment of which may be readily and efficiently assembled and locked together without the use of a tool and the provision of simple and efficient means for firmly retaining in operative assemblage the segments of the rim, when a tire is not mounted on the rim, or when there is a tire mounted thereon for use as a spare, or when the tire is mounted on a wheel and the device is subjected to vibrational pressure.

A still further object of this invention is the provision of novel means for locking and retaining firmly on the wheel, the inflated spare, said means performing the several functions of locking the rim on the wheel, locking the segments of the rim together, retaining said segments in alignment under vibrational pressure, and coacting with the several cooling elements of this invention as a draught conductor.

Another object of this invention is to provide a rim so designed as to prevent the local pressure from causing the destruction of, or injury to, the tire by the thin side walls of the rim when the tire becomes deflated.

A further object of my invention is the provision of a heat eliminating device which will function on any kind of wheel. When such a wheel as one ordinarily used by a railway is equipped with a pneumatic tire for running on a rail and an integral part of the wheel is a peripheral flange adequately extended radially beyond the pneumatic tire for guiding contact with the rail, an air circulating channel is provided within the flange, said channel coacting with other elements of the device to dissipate upon inception the destructive frictional heat generated by the contacting flange and rail.

As this flange has substantially the same curvature as the side of the pneumatic tire which it closely parallels said flange also extending partly under the tire to contact the rail it is obvious that the flange forms an air buffer or wrap similar in formation to the periphery of a dish congesting the heat and preventing the draught consequent to a rushing vehicle from thoroughly penetrating the space between the tire and flange.

As the number of degrees of operative heat remaining in contact with a functioning tire contributes vitally to the amount of damage the tire sustains, in order to overcome this damaging heat radiating from the tire and also the heated flange which heat is congested between the rim and flange, said flange is provided with openings and constructed with a weblike formation with outwardly slanting fins so positioned that the fin edges will impact the atmosphere when the wheel of a forward moving vehicle rotates, causing an intensive cooling draught to circulate in the narrow space between the tire and flange resulting in instant dissipation of the flexing heat radiating from the tire and the rail flange contact heat radiating from the flange. Another efficient achievement is the lightening of the prohibitive weight of a metal wheel with so extensive a flange and the elimination of a portion of the heat retaining metal.

A still further object of my invention is the provision of a railway vehicle wheel with an air circulating channel throughout the interior of the flange and tractive portion of the wheel for eliminating the heat generated by the rotating contact of the wheel and flange and the rail, the circulation of the air through said air channel also functioning to mitigate the contact sound caused by the grinding of the flange against the rail.

Other objects of the invention attained by novel features of construction and arrangements of parts will become manifest by reference to the following specification which describes the invention in connection with the accompanying drawings and in such variations and modifications thereof as will be obvious to those skilled in the art to which my invention relates.

In the drawings:—

Figure 1 is a view in cross section of part of such a wheel as is ordinarily used by railways showing mounted on the wheel my improved rim and coacting heat eliminating elements, integral parts of the wheel shown being a peripheral flange adequately extended radially beyond the tire for guiding contact with the rail on which the tire runs.

Figure 2 is a sectional view illustrating that when the wheel rotates (also see Figure 9) the mouth of the conical air transmitter 1 impacts the atmosphere impelling the air in, whereas the closed back of the conical air transmitter 11 impacts the atmosphere causing a vacuum in the mouth of transmitter 11.

Figure 3 is a perspective view of the segments of the sectional rim not assembled.

Figure 4 is a sectional perspective view of a portion of my improved rim mounted on a tire showing registered on its seat in the interior of the rim an elastic locking element which retains the rim sections firmly together, said locking element resting in its primary position before being moved to protrude into the annexing segment of the rim.

Figure 5 is a view of the parts shown in Figure 4 with the elastic rim locking element protruding from end of one rim segment in the position it occupies when two rim segments are annexed.

Figure 6 is a sectional perspective view showing the conical air transmitter element in coacting operative position with the wheel felly, the elastic rim locking element, the rim and the air circulating channel therein, the tire, and the air transmitting flange in the wheel.

Figure 7 is a back elevation of a wheel as drawn in Figure 9.

Figure 8 for clarity of illustration is a view of the conical shaped air transmitter with parts broken away, it being assumed that in positioning the element it is turned sufficiently so that the back of the conical shell will impact the atmosphere when the wheel rotates causing a vacuum in the mouth of the shell.

Figure 9 is a front elevation of a wheel depicting parts of the invention mounted thereon.

Figure 10 is a sectional view of a modified construction embodying a heat eliminating device in which the rim element and parts integral therewith or mounted directly thereon function to eliminate the incipient heat generated within a pneumatic tire.

Figure 11 shows the construction of a hollow rim retaining bolt with air holes in its side. The nut shown for retaining the lug against the rim is a hollow box-shaped threaded nut, the box portion being hollow on one side for impelling the air, said air then passing through holes in the bolt to the interior of the rim, the function being same as explained in connection with the device shown in Figure 1.

Figure 12 shows a modified assembly of my invention so constructed as to make the heat eliminating principle function without the use of a separate rim. In this construction the tire is mounted on the assembled air channel segments, and the tire inflated after being placed on the felly of the wheel, the air inlet and outlet means being integral parts of the felly.

Figure 13 depicts a modified construction of my invention showing a circulating air channel which functions on a railway vehicle wheel to eliminate the heat generated by the contact of the wheel and railway rail.

Figure 14 is a view in cross section the same as Figure 1 omitting the flange on the wheel for contacting the rail and substituting therefor the ordinary flange for retaining the rim on the wheel, also omitting the rail and the air pipe for transmitting air to the air channel within the outer edge of the flange.

Referring to the drawings, the invention in general comprises a sectional demountable rim 25 with a hollow air channel 6 extending radially from the tire seat of the rim forming an air circulating channel throughout the circumference of the assembled rim, a conical shaped air transmitter 1 which when the wheel rotates impels the air into the mouth of 1 through the inlet opening 2 of pipe 3 affixed to the felly 21 the air then passing through openings 3 and 5 of pipe 3 thence around the rim through air channel 6 thence through outlet openings 7, 8 and 10 of pipe 9 affixed to the felly into the conical shaped air transmitter 11 thence to the atmosphere.

Referring now in detail to the several figures the numeral 1 represents a conical shaped air transmitting shell which may be mounted on or made integral with pipe 3.

A portion of pipe 3 is within the conical shaped shell 1 that portion being turned so that the opening 2 therein faces in the opposite direction to the opening in conical shell 1.

That portion of pipe 3 extending outwardly from conical shell 1 is similar to the pipe of a funnel and has its exterior threaded, its end conically wedge shaped and it contains openings 4 near the end and 5 in the end to let air into channel 6, the forced draught passing through channel 6 thence openings 7, 8 and 10 of pipe 9 to the atmosphere through shell mouth 11.

The numeral 20 represents the disc portion of a wheel the brake drum being 34. The felly 21 has a boss 24 mounted on or made integral with said felly extending radially towards the axis, the cuff being so threaded on its interior that threaded pipe 3 may be progressively registered therein.

On the felly 21 next to the vehicle body is a side wall flange one of its purposes being to serve as a stop limiting the movement of the demountable rim toward said body.

In Figure 1 numeral 25 represents a rim with tire retaining side wall 26 said rim consisting of two or more segments. Figure 3 shows a trisectional rim bearing numerals 25a, 25b, and 25c. Returning to the several figures, 27 represents a hollow corrugated air channel 6 which is integral with rim 25 said channel being formed by depressing its periphery radially at a point midway between the rim side walls 26 said air channel 6 extending circumferentially throughout the rim, the side walls 27 of said air channel being corrugated to provide maximum heat absorbing surface, also strength when using thin, less heat resisting metal, said side walls 27 of channel 6 also being provided with perforations 36 to effect a maximum passage of heat from the inner tube 29 through the air channel walls 27 to the air channel 6.

The depressed portion 35 of rim 25 is formed to provide a snug seat on which the oval shaped sides of the circumferentially oval, cylindrical elastic locking element 19 will slidably register so that when the ends of any two segments of rim 25 are made to contact, the locking element 19 is slidably positioned to protrude into both segments for the purpose of retaining the two rim segments together. Locking element 19 has a part of its apex cut away forming jaws between which the conically wedge shaped end of pipe 3 progressively registers causing the jaws of the elastic locking element 19, to spread and contact firmly the surface of seat 35 for the purpose of operatively retaining in locked position the segments of rim 25.

The pneumatic tire 28 is represented mounted on the rim seat 25, where it is retained by the rim side walls 26, and the depressed portion 27 of the rim is shown extending into the interior of the tire, and the inner tube 29, is pictured in operative position encompassing the depressed portion 27 of the rim, showing that the air circulating channel 6 passes through the interior of inner tube 29, said channel 6 being immediately adjacent the incipient heat radiating from the inner tube through the walls 27 where it is dissipated and driven by the circulating air current moving through channel 6, through the openings 7 and 8 and 10 of pipe 9, thence through outlet 11 to the atmosphere, the movement of said heat to the atmosphere being augmented by the vacuum created at the mouth of shell 11, as that portion of shell 11 opposite the mouth is closed and the closed portion of shell 11 impacts the atmosphere when the wheel rotates, causing said vacuum to occur in the mouth of shell 11.

The wheel felly 21 in Figure 14 is designed with the commonly used side wall flange 22 on the felly next to the vehicle body the purpose of which is to serve as a stop limiting the movement of the demountable rim toward said body. This modified formation of the felly 21 is designed to function when the demountable rim 25 has a pneumatic tire mounted thereon and the tractive portion of said tire contacts when traveling surfaces other than a rail surface.

In the construction as depicted in Figure 14 a commonly used lug 39 riding on the usual bolt 40 which screwed into an opening in the felly serves purpose of augmenting bolt 3 in the function of retaining the rim on the felly. This construction varies from that shown in Figure 1 in that the extended flange 23, and the air pipe 13 extending to said flange, are omitted and the lug feature 39 added.

The flange 23 has an air circulating channel 15 an important element in performing the function of eliminating the frictional heat generated by the contacting flange 23 and rail 31. Said heat is removed when the rotation of the wheel causes conical shell 1 to impact the atmosphere and force air into shell 1 thence through openings 2 and 12 in pipe 3 thence through pipe 13 through opening 14 in flange 23 to the air channel 15 thence through 15 and out through exit opening 16 into and through pipe 17 through openings 18 and 10 of pipe 9 into shell 11 from which it is both impelled and drawn to the atmosphere.

The flange 23 has a circumferentially movable part 30, of ring-like construction, which registers with a seat on the flange and is retained thereon by bolts 41 on the periphery of said flange between the flange and rail, this ring forming that portion of the flange which contacts the rail, the ring being made movable to simplify construction and to provide cleansing access to channel 15. Flange 23 is also provided with openings 43, and constructed with a weblike formation, with outwardly slanting fins 42 so positioned that the fin edges will impact the atmosphere when the wheel rotates, causing an intensive cooling draught to circulate in the narrow space between the tire 28 and flange 23.

The operation of the device is simple. In order to assemble the several parts in operative position the depressed portion 27 of rim segment 25a is covered with the inner tube and pushed into the tire as shown in Figure 1, and locking element 19 placed on its seat 35 in the rim, then segment 25b is given the same handling the ends of both segments being made to contact, and locking element 19 is moved from segment 25a into segment 25b until it touches stop 37, and in a similar manner rim segment 25c is set in place and the locking element 19 moved so as to retain it in place, the inner tube then being inflated and the rim may then be placed on the wheel or hung on the car as a spare. To place the rim on the wheel it is simply placed on the felly, and bolts 3 and 9 screwed into felly boss 24 and the rim is locked on the wheel. When the wheel rotates, the air is impelled into conical shell 1 thence through the cooling channels of the deivce and out pipe 9 and shell mouth 11 to the atmosphere, carrying the heat with it.

In Figure 10 the rim 44 is constructed with curved vibration-reducing flanges 45 on each side of the rim, said flanges extending in a direction opposite to the side wall flanges 26 which retain the tire on the rim, said flanges 45 having slits 46 at intervals which provide resilient, vibration and shock absorbing springs. On the outward side of the flange the metal is struck outwardly at 48 and 50 with open mouths 49 and 51 said mouths so positioned that when the wheel rotates mouth 49 impacts the atmosphere and mouth 51 faces in the opposite direction of mouth 49 and creates a vacuum. The holes 47 and 52 are for registering the bolts 54 and 57, the nut 53 for holding the lug against the rim. The hollow nut 58 registers on bolt 57 and when bolt 57 is registered in holes 47 and 52 and the open end 59 of nut 58 impacts the atmosphere air enters opening 59 and passes through the hole in the bolt at a point on the bolt inside the nut said air passing to the rim channel through holes 56, the function being the same as already explained in connection with Figure 1.

A modified construction of my invention is shown in Figure 12 in which the segments of the air channel 63 are fixedly assembled with the rim, and inner tube mounted thereon, the segments being locked together by spring 19, so that this assembly may be placed on the felly 64 of the wheel.

After the elements are mounted on the felly and the wheel rotates, air is impelled in through the opening in 65 thence through air channel 63 thence out to the atmosphere through opening 66, said opening 66 facing in the opposite direction from opening 65. The bolt 67 screws through the felly into the lock spring 19, tightening the elements and retaining same on the felly.

On the felly is seat 69 for ring 68 which may be used to augment bolt 67 in retaining the elements on the felly, however ring 68 may be dispensed with as bolt 67 and flange 70 on the felly and flange 71 on the air channel structure 63 will retain the tire on the wheel.

In another modified construction of my invention as shown in Figure 13 the numeral 72 is the felly of a railway vehicle wheel similar to 64 in Figure 12, the rim 73 being so shaped as to form, when mounted on the felly 72, an air channel 76 which extends throughout the entire circumference of the wheel.

When the wheel rotates, air enters upstanding pocket 74, passes through air channel 76, and out air pocket 75. The rim 72 runs directly on railway rail 77, and the bolt and nut 78 detachably retains the rim 73 on the wheel, in operative position.

Having described my invention what I claim as new and desire to secure by Letters Patent, is:—

1. In combination with the felly of a vehicle wheel, a sectional demountable rim having a hollow buffer portion, hollow resilient binder means having a pair of jaws slidably positioned in said hollow buffer portion, said felly accommodating movable hollow bolt keeper means with wedge shaped ends comprising means which function to countervail operative frictional wear consequent when said bolt is moved inward and said wedge shaped ends gradually spread the jaws of said binder means axially to a predetermined degree for locking the segments of said rim in operative alignment on said felly.

2. In combination with the felly of a vehicle wheel a sectional demountable rim therefor having a hollow longitudinal channel and hollow longitudinal binder means seated in the hollow channel of said rim movable hollow means registering radially in said felly and coacting with the binder means seated in said rim, stop means in said hollow channel for adjusting longitudinally said binder means for receiving coactively said radially movable hollow means for functioning to retain in assembled operative alignment the sections of said rim in assembled operative alignment on said felly.

3. In combination with the felly of a vehicle wheel a hollow sectional demountable rim therefor having a hollow longitudinal channel with connecting air openings, said hollow portion serving as a buffer and air circulating means, an inner tube for folding over the hollow buffer portion of said rim, means for inflating said inner tube, a pneumatic tire for said rim, hollow longitudinal binder means in the hollow buffer portion of said rim, means progressively registering in said felly which function to cause said binder means to tighten to a predetermined degree and retain adjoining segments of said rim in operative alignment on said felly the sides of said buffer portion of said rim being so perforated and corrugated as to provide means which function to prevent a frictional flexing slippage of said inner tube and cause a maximum of heat in said inner tube to radiate inwardly into the hollow channel in said rim and to the atmosphere.

4. In combination with the felly of a vehicle wheel, a demountable sectional rim therefor and longitudinal binder means to hold the sectional rim in assembled relation, movable rim keepers progressively registering radially in said felly and coacting with said binder means as to comprise means, which function, when said rim is mounted on said felly, to cause the jaws of said resilient longitudinal rim binder means to so spread and tighten as to prevent vibrational operating strain from loosening said rim keepers, said longitudinal rim binder means, and said rim segments.

5. In combination a vehicle wheel a sectional demountable rim therefor said wheel and said rim being provided with hollow air carrying means with connecting inlet and outlet breathing mouths facing opposite to the curvilinear motion of said wheel said inlet mouths being smaller than said outlet mouths with preferably streamlined lips, said mouths so coacting with said hollow air carrying means, when said wheel rotates, as to create vacuum energy air suction means which functions to prevent sand grit and splash from entering while drawing air into said inlet mouths, through the air carrying means with which said wheel and rim is provided and thence out of said outlet mouths.

6. In combination a railway vehicle, a wheel for said vehicle, a flange on said wheel for guiding said vehicle and retaining said vehicle on railway rails said wheel being provided with a rim for tractive contact with said rail and means for detachably retaining said rim on said wheel, hollow air circulating means being provided between said rim, and said wheel and wheel flange, and said rim, said air circulating means functioning when said wheel rotates to cause air to circulate into, through and out of said wheel flange.

7. In combination a vehicle wheel a felly and a hollow sectional demountable rim therefor having binder means with a pair of jaws, the inner plane of said felly being provided with threaded bosses for accommodating suitably threaded hollow bolt keeper means the ends of which being wedge shaped as to expand the jaws of the sectional rim binder means seated in the hollow channel of said rim so as to firmly retain the segments of the sectional rim in operative alignment, the threaded hollow bolt keepers also retaining the assembled rim on said felly, and being secured against loosening by the resilient pressure of the jaws of said binder means in the hollow channel of said rim.

8. In combination a vehicle wheel, a felly, a sectional demountable rim therefor having a longitudinal hollow channel said channel having side walls of springlike construction the edges of which seat on said felly, said side walls comprising vibration absorbing means, hollow means for retaining said rim upon said felly, said retaining means having inlet and outlet openings which function to circulate air into through and out of said rim when the rim is mounted on said felly and said wheel rotates.

9. In combination a railway vehicle wheel, a felly, a demountable rim for said felly, a pneumatic tire for said rim and means for retaining said rim on said felly, said wheel being provided with a flange having substantially the same curvature of said tire and adequately extended for guiding contact with said rail said flange being provided with a hollow channel with outlet and inlet openings said channel and openings comprising means which function when said wheel rotates to circulate air into through and out of said flange.

10. In combination a vehicle wheel, a felly, a demountable sectional hollow air carrying rim therefor and hollow air carrying longitudinal binder means for retaining the several segments of said rim in assembly and movable hollow air carrying means mounted in said felly carrying air to said rim and binder means and also retaining said assembled rim in alignment on said felly.

11. In combination a vehicle wheel, a felly for said wheel, a hollow sectional rim said hollow portion serving as a buffer and air circulating means for mounting a tire on said wheel, hollow longitudinal binder means in said rim to hold the sectional rim in assembled relation and hollow inlet and outlet breathing pipes having mouths with strainers therein, said pipes being mounted on said felly and registering in and locking said longitudinal binder means so as to detachably retain said rim on said wheel, an inner tube folding over the buffer portion of said rim, and means for inflating said inner tube, said breathing pipes and mouths, functioning to cause air to circulate into said inlet strainer mouths and breathing pipes, thence through said rim, thence out of said outlet breathing pipes and strainer mouths by both circulation and vacuum energy means.

12. In combination a vehicle wheel, a sectional rim having a hollow air carrying channel, hollow longitudinal binder means in said rim and hollow means removably carried by said wheel for locking and causing said binder means to hold said rim in operative alignment and fixedly retain in assemblage said rim on said wheel, said locking means being provided with inlet and outlet breathing mouths facing opposite to the curvilinear motion during said wheel's forward linear movement, said inlet mouths with preferably streamlined lips being smaller than said outlet mouths said inlet and outlet mouths comprising means which will, when said wheel travels, utilize the linear air impact energy in cooperation with the curvilinear air resistance energy to create a vacuum suction energy in said hollow channels in said mouths breathing pipes and rim which functions to draw atmospheric air into said smaller inlet mouths through said hollow channels and out of said larger mouths without letting sand grit and splash in.

13. In combination a vehicle wheel, a felly for said wheel a hollow sectional rim for mounting a tire on said wheel, hollow longitudinal binder means in said rim to hold the sectional rim in assembled relation and hollow inlet and outlet breathing pipes having inlet and outlet mouths said pipes being mounted on said felly and functioning to detachably retain said rim on said wheel also registering in and locking said binder means in said rim dome shaped buffers positioned in front of said inlet and outlet mouths to deflect and prevent grit and splash from entering said mouths when said wheel rotates and air circulates through said openings.

14. In combination a vehicle wheel a felly for said wheel, a hollow sectional rim for mounting a tire on said wheel, hollow longitudinal binder means in said rim and means removably carried by said felly for locking said binder means to hold the sectional rim in assembled relation and retain said rim on said felly the metal of said felly being so struck up as to comprise inlet and outlet breathing mouths connecting with the channel in said rim the openings of said mouths facing opposite to the curvilinear motion during said wheel's forward linear movement said inlet mouths with preferably streamlined lips having smaller openings than said outlet mouths said inlet and outlet mouths comprising means which will when said wheel travels utilize the linear air impact energy in cooperation with the curvilinear air resistance energy to create a vacuum suction energy in said mouths and hollow rim which functions to draw atmospheric air into said smaller inlet mouths through said hollow channel in said rim and out of said larger outlet mouths while accomplishing the vital result of preventing said grit and splash from entering.

15. In combination a vehicle, a wheel for said vehicle with hollow elements mounted thereon said wheel and said elements being provided with hollow channels the hollow channels with which said wheel is provided being connected with and cooperating with said hollow channels in said elements on said wheel the channels with which said wheel is provided having inlet and outlet breathing mouths facing opposite to the curvilinear motion during said wheels forward linear movement said inlet mouths with preferably streamline lips having smaller openings than said outlet mouths, said inlet and outlet mouths comprising means which will when said wheel travels utilize the linear air impact energy in cooperation with the curvilinear air resistance energy to create a vacuum suction energy in said mouths and said hollow channels which functions to draw atmospheric air into said smaller inlet mouths through said hollow channels and out of said larger outlet mouths while accomplishing the vital result of preventing sand grit and splash entering.

16. In combination a vehicle, a wheel for said vehicle a hollow rim for holding a tire being detachable or fixedly mounted on said wheel, the cross section portion and flanges of said rim being provided with cooperating circumferential hollow channels, means for detachably mounting said rim on said wheel there being connected with said rim hollow inlet and outlet breathing pipes with mouths facing opposite to the curvilinear motion during said wheels forward linear movement said inlet mouths with preferably streamlined lips having smaller openings than said outlet mouths, said inlet and outlet mouths comprising means which will when said wheel travels utilize the linear air impact energy in cooperation with the curvilinear air resistance energy to create a vacuum suction energy in said mouths hollow breathing pipes and hollow rim which functions to draw air into said smaller inlet mouths through said inlet breathing pipes thence through said rim and out of said outlet breathing pipes and mouths while accomplishing the vital result of preventing said grit and splash from entering.

17. In combination a vehicle, a vehicle wheel provided with a hollow rail flange said flange having air inlet and outlet opening means, a rim for said wheel and means for retaining said rim on said wheel, there being provided hollow air circulating channel means in said rim and in said flange, the channel in said rim being connected with the channel in said flange by hollow air circulating channel means in said wheel, said means in said rim, flange and wheel functioning when said wheel rotates to circulate air into said flange through said connecting means into said rim and out of said rim through said connecting means into said flange and out of said flange.

WILLIAM A. ANTILOTTI.